US010994447B2

(12) United States Patent
Sana

(10) Patent No.: US 10,994,447 B2
(45) Date of Patent: May 4, 2021

(54) SEAL STRUCTURE OF MOLD FOR MANUFACTURING COMPOSITE MATERIAL STRUCTURE

(71) Applicant: KAWASAKI JUKOGYO KABUSHIKI KAISHA, Kobe (JP)

(72) Inventor: Toshikazu Sana, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 99 days.

(21) Appl. No.: 16/466,109

(22) PCT Filed: Nov. 30, 2017

(86) PCT No.: PCT/JP2017/043103
§ 371 (c)(1),
(2) Date: Jun. 3, 2019

(87) PCT Pub. No.: WO2018/101418
PCT Pub. Date: Jun. 7, 2018

(65) Prior Publication Data
US 2020/0061870 A1 Feb. 27, 2020

(30) Foreign Application Priority Data
Dec. 1, 2016 (JP) .............................. JP2016-233884

(51) Int. Cl.
*B29C 33/00* (2006.01)
*F16J 15/10* (2006.01)
(Continued)

(52) U.S. Cl.
CPC ......... *B29C 33/0038* (2013.01); *F16J 15/104* (2013.01); *B29C 33/485* (2013.01);
(Continued)

(58) Field of Classification Search
CPC ... B29C 33/0038; B29C 33/485; B29C 41/38; F16J 15/025; F16J 15/027; F16J 15/104
See application file for complete search history.

(56) References Cited

U.S. PATENT DOCUMENTS 2,910,209 A * 10/1959 Nelson .................. A61G 17/02
220/378
5,022,845 A * 6/1991 Charlson ................ B29C 33/30
156/425

(Continued)

FOREIGN PATENT DOCUMENTS

JP   H07-096539 A   4/1995
JP   2010-507504 A  3/2010
(Continued)

*Primary Examiner* — Nicholas L Foster
(74) *Attorney, Agent, or Firm* — Oliff PLC

(57) ABSTRACT

A seal structure is used in a mold constituted by a plurality of segments to manufacture a hollow composite material structure. In the seal structure, a seal member formed in a line shape having ends is inserted in a seal groove provided on at least one of adjacent side surfaces of the segments. A lip portion is provided at a seal upper portion of the seal member such that at least a tip end of the lip portion projects to an outside of the seal groove. When the adjacent side surfaces of the segments are coupled to each other, the seal member is crushed in a cross sectional direction by the other of the adjacent side surfaces of the segments. With this, complication of the manufacture of the composite material structure can be suppressed or avoided while realizing a satisfactory sealed state between the adjacent segments.

7 Claims, 9 Drawing Sheets

(51) Int. Cl.
  *F16J 15/02* (2006.01)
  *B29C 33/48* (2006.01)
  *B29C 41/38* (2006.01)

(52) U.S. Cl.
  CPC ............ *B29C 41/38* (2013.01); *F16J 15/025* (2013.01); *F16J 15/027* (2013.01)

(56) References Cited

U.S. PATENT DOCUMENTS

| | | | |
|---|---|---|---|
| 5,173,315 A * | 12/1992 | Charlson | B29C 33/30 156/425 |
| 8,382,467 B2 * | 2/2013 | Micheaux | B29C 33/38 425/403 |
| 9,426,912 B2 * | 8/2016 | Miki | H05K 5/06 |
| 9,587,744 B2 * | 3/2017 | Yoshida | F16J 15/025 |
| 10,473,218 B2 * | 11/2019 | Dore | F16J 15/025 |
| 2010/0032862 A1 | 2/2010 | Micheaux et al. | |
| 2010/0117309 A1 * | 5/2010 | Yudovsky | F16J 15/106 277/644 |
| 2013/0207352 A1 | 8/2013 | Furubayashi et al. | |
| 2014/0291940 A1 * | 10/2014 | Miki | F16J 15/025 277/641 |
| 2016/0258533 A1 * | 9/2016 | Yoshida | F16J 15/025 |
| 2020/0070443 A1 * | 3/2020 | Sana | B29C 33/485 |
| 2020/0078990 A1 * | 3/2020 | Sana | B29C 33/306 |

FOREIGN PATENT DOCUMENTS

| | | |
|---|---|---|
| JP | 2011-149526 A | 8/2011 |
| JP | 2016-151282 A | 8/2016 |
| JP | 2016-183730 A | 10/2016 |
| WO | 2012/056768 A1 | 5/2012 |

\* cited by examiner

SEAL STRUCTURE OF MOLD FOR MANUFACTURING COMPOSITE MATERIAL STRUCTURE

TECHNICAL FIELD

The present invention relates to a seal structure of a mold for manufacturing a hollow composite material structure, the mold being located inside the composite material structure, being constituted by a plurality of segments, and being kept as a single structure by coupling adjacent side surfaces of the segments to each other, the seal structure being provided at the adjacent side surfaces of the segments. The present invention particularly relates to a seal structure of a mold used for manufacturing a composite material structure for use as a fuselage of an aircraft.

BACKGROUND ART

In recent years, fiber-reinforced resin composite materials (hereinafter suitably abbreviated as "composite materials") are widely used in the fields in which metal materials have been conventionally used. Among the composite materials, carbon fiber reinforced materials formed by impregnating carbon fibers as reinforced fibers with matrix resin such as epoxy resin are lighter and stronger than the metal materials. Therefore, the carbon fiber reinforced materials are widely adopted in the fields of sports goods, industrial machines, aerospace, and the like.

In the field of aerospace among these fields, for example, stiffened panels formed by integrating skins and stiffeners made of the composite material are adopted in structures, such as wings and fuselages of aircrafts. One of typical stiffeners is a stringer. Examples of the method of integrating the stiffeners made of the composite material and the skins made of the composite material include a co-curing method and a co-bonding method. According to the co-curing method, a plurality of prepregs which become the stiffeners are laminated, and a plurality of prepregs which become the skins are laminated. Then, these prepregs are cured by an autoclave to be integrally molded. According to the co-bonding method, after the stiffeners are first cured by the autoclave, a plurality of prepregs which become the skins are laminated and cured by the autoclave to be integrally molded.

One example of the technology for manufacturing such structures of the aircrafts is a composite tool for molding a cylinder-shaped portion as disclosed in PTL 1. In order to manufacture the cylinder-shaped portion made of the composite material, the composite tool is configured by: arranging a plurality of (seven, for example) members or tiles in a cylindrical manner; and coupling the members or tiles to one another. Seal units (seal members) are arranged at respective coupled portions each between the members (tiles).

A specific example of the seal unit is an O-ring gasket that is expandable. Grooves in which the O-ring gaskets are provided are located on respective side surfaces of the adjacent members (tiles) so as to be displaced from each other (so as to be alternately arranged), and the O-ring gaskets are arranged in these grooves. The O-ring gasket has a hollow structure (tubular structure) in a section thereof and is expandable by a pressure difference generated during autoclaving.

The O-ring gasket seals between the adjacent members in a longitudinal direction. Therefore, in PTL 1, in order to realize sealing at end portions of the adjacent members, a leak prevention insertion portion is provided at the end portions. The insertion portion includes two holes facing the groove at which the O-ring gasket is arranged. A part of the O-ring gasket is exposed to an outside through between the adjacent members. The exposed O-ring gasket is connected to a high-pressure air source. With this, the O-ring gasket can be expanded by pressurizing an inside of the O-ring gasket.

According to PTL 1, in order not to weaken the structures of the members (tiles), the grooves are formed on the adjacent side surfaces of the members so as to be provided alternately (so as to be displaced from each other). Further, since the O-ring gaskets are provided at the grooves arranged as above, the O-ring gaskets are also provided so as to be displaced from each other. Therefore, by the pressurization of the inside of the O-ring gasket by the high-pressure air source in addition to the pressure difference generated by the autoclave, the O-ring gasket arranged at one of the adjacent side surfaces of the members expands to contact the other side surface, and the O-ring gasket arranged at the other side surface expands to contact the one side surface. With this, double seal is realized between the adjacent members.

CITATION LIST

Patent Literature

PTL 1: Published Japanese Translation of PCT Application No. 2010-507504

SUMMARY OF INVENTION

Technical Problem

However, according to the configuration disclosed in PTL 1, in order to realize a stable sealed state, various conditions need to be appropriately adjusted as below. Therefore, the method of manufacturing the cylinder-shaped portion may become complex.

For example, the O-ring gasket disclosed in PTL 1 is a seal unit (seal member) that is intended to expand. Therefore, in order to realize a satisfactory and stable sealed state, conditions of the autoclave need to be set to generate a preferred pressure difference, and shop air of adequate pressure needs to be continuously supplied from an outside during the autoclaving.

Further, heat expansion of the O-ring gasket during the autoclaving needs to be considered. For example, in order to realize a predetermined expansion coefficient in a cross sectional direction of the tubular structure, a thermal expansion coefficient in the cross sectional direction needs to be considered in addition to the pressure difference of the autoclave and the pressure of the shop air. Further, as described above, since the O-ring gasket is partially exposed from both end portions of the coupled portion, the amount of exposure is predicted to increase by heat expansion in a line direction. Therefore, the O-ring gasket needs to be fixed at the leak prevention insertion portion such that the increase in the amount of exposure due to the heat expansion is prevented while keeping the hollow state of the tubular structure.

Instead of the seal member configured to expand by the pressure difference as disclosed in PTL 1, a seal member configured to be compressed (crushed) in the cross sectional direction by a load may be used. However, according to the seal member configured to be compressed, as a seal length of the segment (the member or the tile in PTL 1) constituting the mold (the composite tool in PTL 1) increases, the load for compressing the seal member increases. The load may further increase depending on the hardness and shape of the seal member.

Therefore, when one segment is moved to be combined with the other segment, the segment needs to be moved by a large load for compressing the seal member. In order to manufacture high-quality composite material structures, it is preferable that a level difference be little between outer peripheral surfaces of the adjacent segments. However, as the load during the movement of the segment increases, the degree of difficulty of position adjustment of the segments increases. Therefore, assembly work of the mold becomes complex.

The present invention was made to solve the above problems, and an object of the present invention is to provide a seal structure of a mold used for manufacturing a hollow composite material structure and constituted by a plurality of segments, the seal structure being capable of suppressing or avoiding complication of the manufacture of the composite material structure while realizing a satisfactory sealed state between the adjacent segments.

Solution to Problem

To solve the above problems, a seal structure of a mold for manufacturing a composite material structure according to the present invention is a seal structure of a mold for manufacturing a hollow composite material structure, the mold being located in the hollow composite material structure, being constituted by a plurality of segments, and being kept as a single structure by coupling adjacent side surfaces of the segments to each other, the seal structure being provided at the adjacent side surfaces of the segments. The seal structure includes: seal grooves each provided on at least one of the adjacent side surfaces of the segments; and seal members each formed in a line shape having ends and inserted in the seal groove to seal between the segments by coupling the adjacent side surfaces of the segments to each other. A part of the seal member which part contacts a bottom surface of the seal groove when the seal member is inserted in the seal groove is referred to as a seal bottom portion. A part of the seal member which part is opposed to the seal bottom portion is referred to as a seal upper portion. A lip portion is provided at the seal upper portion such that at least a tip end of the lip portion projects to an outside of the seal groove when the seal member is inserted in the seal groove. The seal member is hollow therein or includes a concave portion on at least the seal bottom portion of the seal member. When the adjacent side surfaces of the segments are coupled to each other, the seal member is crushed in a cross sectional direction by the other of the adjacent side surfaces of the segments.

According to the above configuration, the seal member includes the lip portion and the hollow or concave portion and is formed in a line configuration having ends. Therefore, regarding the cross sectional direction of the seal member, the sealed state can be formed by compressing the seal member without applying a high load. Regarding a longitudinal direction of the seal member, the expansion (linear expansion) in the longitudinal direction generated by the heating during the autoclaving can be easily adjusted by both end portions of the seal member. With this, the more satisfactory and stable sealed state can be realized between the adjacent segments. In addition, since the increase in the moving load of the segment can be suppressed or avoided, the level difference between the adjacent segments can be satisfactorily adjusted when assembling the mold. As a result, the complication of the manufacture of the composite material structure can be suppressed or avoided while realizing the satisfactory sealed state between the adjacent segments.

Advantageous Effects of Invention

According to the above configuration, the present invention has an effect of being able to provide a seal structure of a mold used for manufacturing a hollow composite material structure and constituted by a plurality of segments, the seal structure being capable of suppressing or avoiding complication of manufacture of the composite material structure while realizing a satisfactory sealed state between the adjacent segments.

DESCRIPTION OF EMBODIMENTS

Hereinafter, a representative embodiment of the present invention will be explained with reference to the drawings.

In the following explanations and the drawings, the same reference signs are used for the same or corresponding components, and a repetition of the same explanation is avoided.

Mold for Manufacturing Composite Material Structure

First, a mold for manufacturing a composite material structure (hereinafter referred to as a "mold") according to the present embodiment will be explained with reference to FIGS. 1A to 4.

Figure 1A:
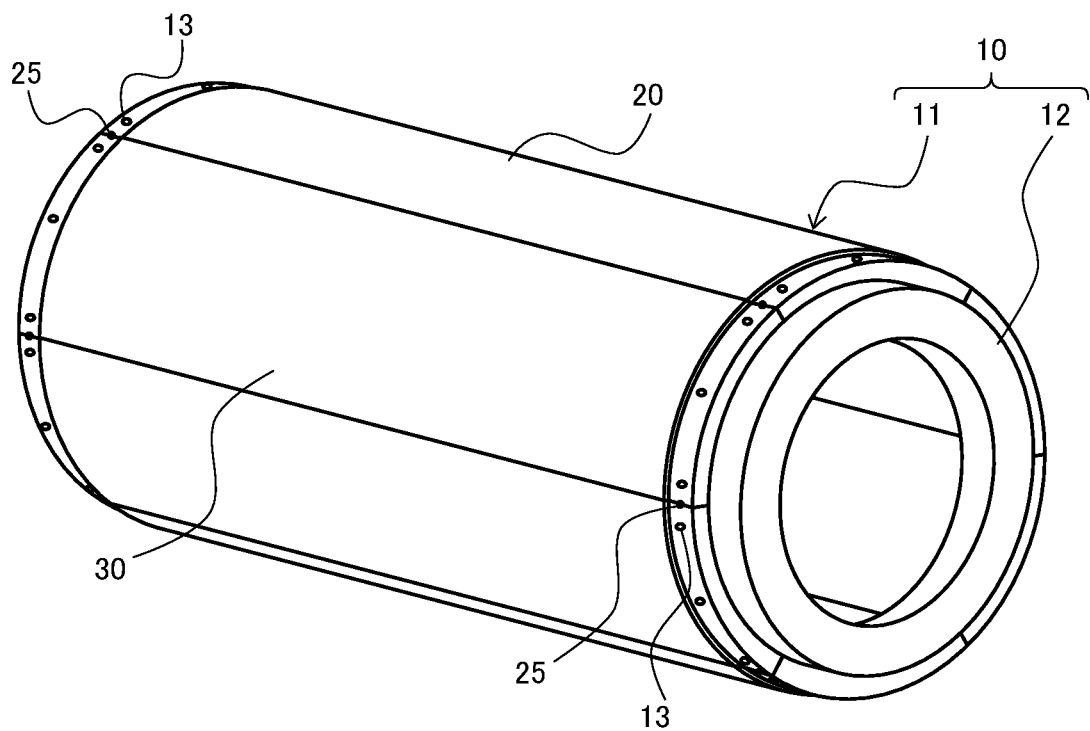
FIG. 1A is a schematic perspective view showing one example of the configuration of a mold for manufacturing a composite material structure according to the present embodiment.
Figure 1B:
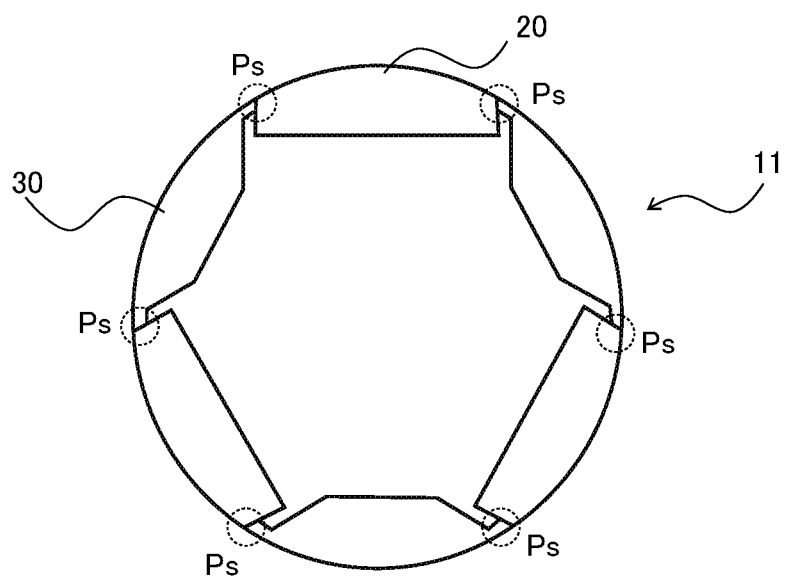
FIG. 1B is a schematic end surface view showing one example of the configuration of a mandrel included in the mold for manufacturing the composite material structure shown in FIG. 1A.

As shown in FIG. 1A, a mold 10 according to the present embodiment includes at least a mandrel 11 and a pair of support rings 12. The mandrel 11 is a single cylindrical structure (cylindrical member), and the support rings 12 are located at both ends of the mandrel 11. The mandrel 11 is formed by coupling side surfaces of six segments, i.e., three first segments 20 and three second segments 30 to one another. As schematically shown in FIG. 1B, in the mandrel 11, the first segments 20 and the second segments 30 are alternately coupled to one another. Both ends of the mandrel 11 are supported by the respective support rings 12. Thus, the six segments 20 and 30 are kept in a cylindrical shape.

As shown in FIG. 1A, a plurality of vacuum suction holes 13 are provided on surfaces of both end portions of the segments 20 and 30. Each of both end portions of a seal groove 25 is exposed between a peripheral edge surface of an end portion of the segment 20 and a peripheral edge surface of an end portion of the adjacent segment 30. A below-described seal member is inserted into the seal groove 25. In FIG. 1B, parts Ps surrounded by dotted lines are positions at which seal structures of the mold 10 are provided. The parts Ps correspond to positions at each of which the side surface of the first segment 20 and the side surface of the second segment 30 are coupled to each other. The seal structure according to the present embodiment includes the seal groove 25 shown in FIG. 1A. The seal structure will be described later.

Groove-shaped concave portions to which stringers are attached are formed on an outer peripheral surface of the mandrel 11 except for peripheral edges of both end portions of the mandrel 11. In order to clearly show the configurations of the mandrel 11 and the segments 20 and 30, the groove-shaped concave portions are not shown in FIG. 1A and the other drawings showing the mandrel 11 and the segments 20 and 30.

Figure 2A:
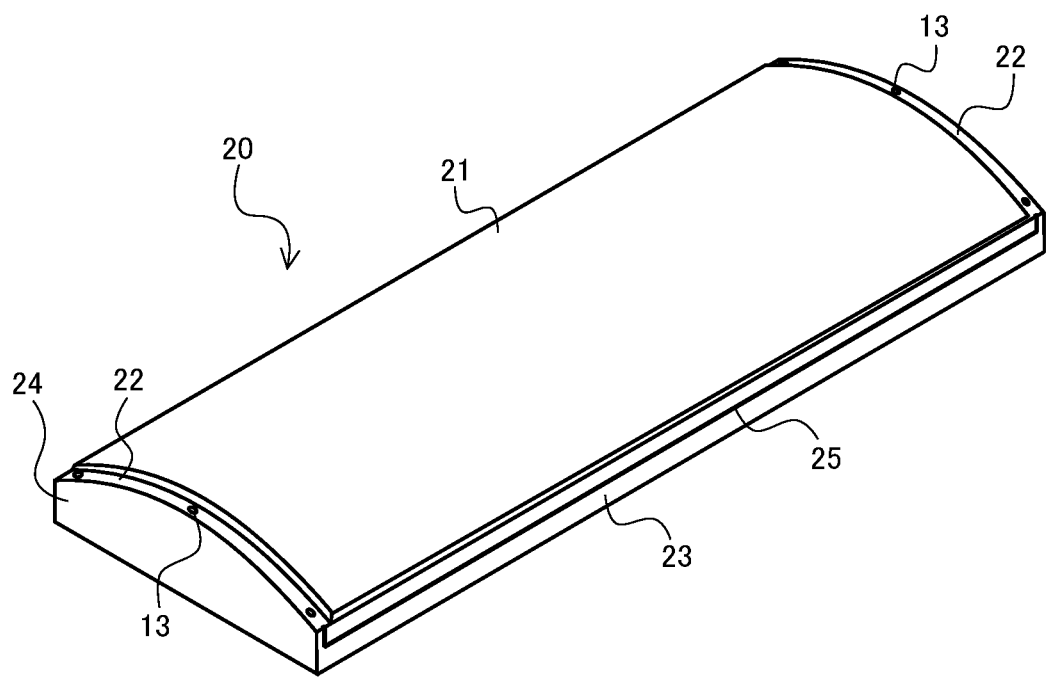
FIG. 2A is a perspective view showing the configuration of a first segment forming a cylindrical structure of the mold for manufacturing the composite material structure shown in FIGS. 1A and 1B.

As shown in FIG. 2A, the first segment 20 is formed in a rectangular flat plate shape. A surface of the first segment 20 which surface constitutes the outer peripheral surface of the mandrel 11 is referred to as a "segment front surface 21," and the segment front surface 21 is a convex curved surface (a convex surface or a projectingly curved surface). Further, the peripheral edge surfaces of both end portions of the first segment 20 are referred to as "segment end portion surfaces 22," and the vacuum suction holes 13 are provided on the segment end portion surfaces 22.

Figure 2B:
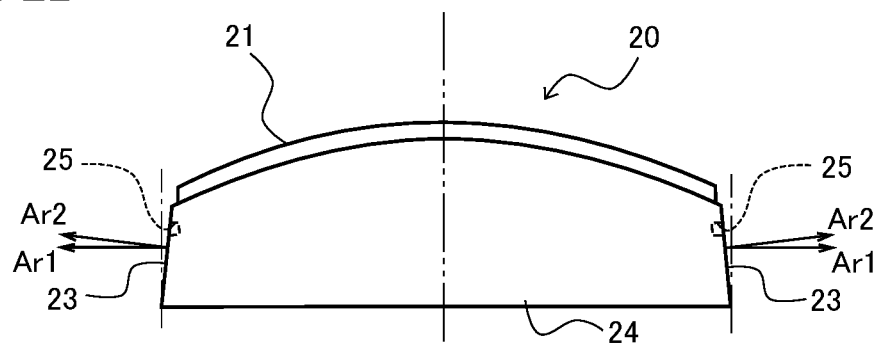
FIG. 2B is a surface view showing an end portion of the first segment shown in FIG. 2A.

A surface of the first segment 20 which surface is coupled to the adjacent second segment 30 is referred to as a "segment side surface 23." As shown in FIGS. 2A and 2B, when the first segment 20 is horizontally arranged with the segment front surface 21 facing upward, the seal grooves 25 are provided on the segment side surfaces 23 in a longitudinal direction of the segment side surface 23. In the present embodiment, as shown in FIG. 2A, both end portions of the seal groove 25 are bent toward the respective segment end portion surfaces 22.

A surface of the first segment 20 which surface constitutes an end surface of the mandrel 11 is referred to as a "segment end surface 24." As shown in FIGS. 2A and 2B, the seal groove 25 cannot be visually confirmed from the segment end surface 24. Therefore, in FIG. 2B, the seal grooves 25 are shown by broken lines. In order to couple the segment side surface 23 of the first segment 20 to the side surface of the second segment 30, a coupling member (not shown) is provided on the segment side surface 23 of the first segment 20. In order to fix the segment end surface 24 to the support ring 12, a fixing member (not shown) is provided on the segment end surface 24.

Each of both segment side surfaces 23 of the first segment 20 faces a horizontal direction or a direction inclined upward relative to the horizontal direction. In the present embodiment, as shown in FIG. 2B, for example, a normal direction of the segment side surface 23 extends in the direction inclined upward relative to the horizontal direction.

As described below, in the present embodiment, when assembling the mandrel 11 in a cylindrical shape, the second segments 30 are first fixed to the support rings 12, and each of the first segments 20 is then fitted between the second segments 30 from a lower side to an upper side to be fixed. Therefore, in order not to hinder this fitting work, the segment side surface 23 of the first segment 20 is only required to be formed such that the normal direction of the segment side surface 23 extends (is directed) in the horizontal direction (direction shown by an arrow Ar1 in FIG. 2B). In other words, when the first segment 20 is arranged horizontally, the segment side surface 23 is located along a vertical direction (direction along a one-dot chain line shown in FIG. 2B).

After the cylindrical composite material structure (for example, a one-piece barrel (OPB)) is molded by using the mold 10 including the mandrel 11, the composite material structure is removed from the mold 10. This removal is performed by disassembling the mandrel 11. The disassembling of the mandrel 11 is performed in the reverse order to the assembling of the mandrel 11. Therefore, each of the first segments 20 is pulled out from between the second segments 30.

On this account, as shown in FIG. 2B, it is preferable that the segment side surface 23 of the first segment 20 be formed such that the normal direction of the segment side surface 23 is inclined upward (toward the segment front surface 21, i.e., in a direction shown by an arrow Ar2 in FIG. 2B). The upward inclination of the normal direction of the segment side surface 23 denotes that the segment side surface 23 is inclined so as to face upward. In other words, the segment side surface 23 is inclined such that a rear-side edge of the segment side surface 23 spreads more outward than a front-side edge of the segment side surface 23. The inclination of the segment side surface 23 form "draft" on the segment side surface 23 of the first segment 20. Thus, the first segment 20 is easily pulled out from between the second segments 30, and therefore, the mandrel 11 is easily disassembled.

The inclination angle (draft angle) of the segment side surface 23 is not especially limited and is suitably set to a preferred angle depending on specific shapes, dimensions, and the like of the mandrel 11 and the mold 10. For example, in the present embodiment, the inclination angle (draft angle) of the segment side surface 23 may be set to 8 to 12 degrees, preferably about 10 degrees. The inclination angles of the opposing segment side surfaces 23 may be equal to each other or different from each other.

Figure 3A:
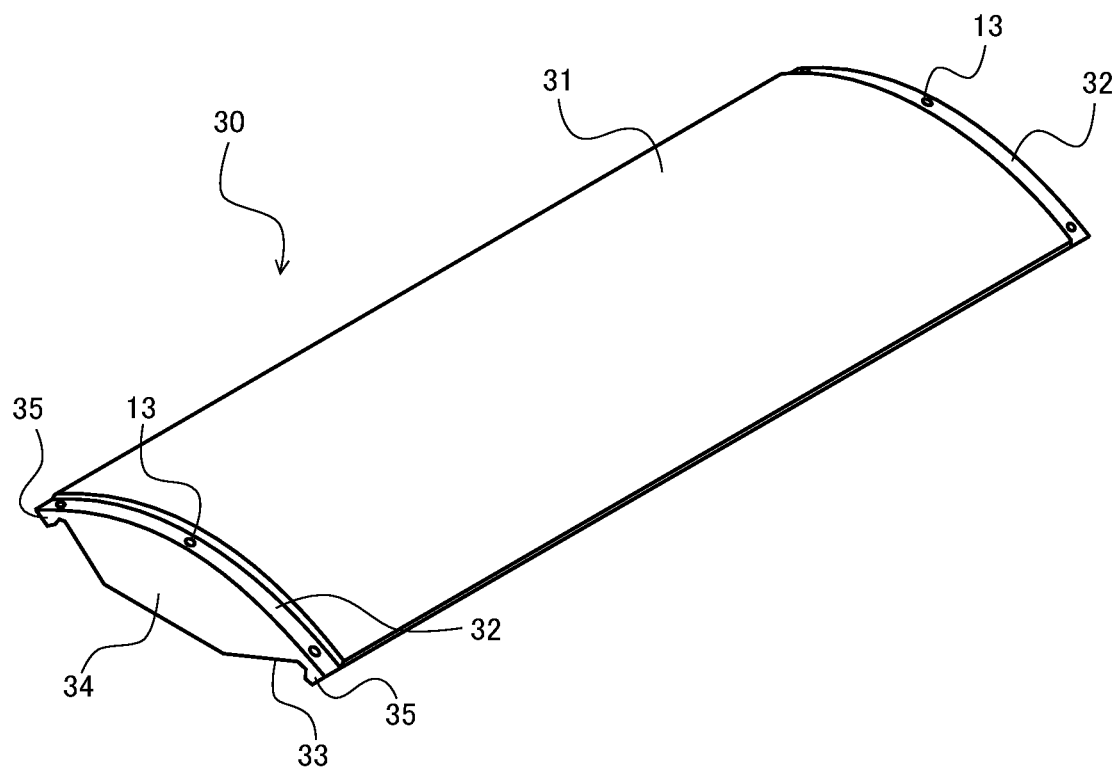
FIG. 3A is a perspective view showing the configuration of a second segment forming the cylindrical structure of the mold for manufacturing the composite material structure shown in FIGS. 1A and 1B.

As shown in FIG. 3A, as with the first segment 20, the second segment 30 is formed in a rectangular flat plate shape. A surface of the second segment 30 which surface constitutes the outer peripheral surface of the mandrel 11 is referred to as a "segment front surface 31," and the segment front surface 31 is a convex curved surface as with the segment front surface 21 of the first segment 20. Further, as with the first segment 20, the peripheral edge surfaces of both end portions of the second segment 30 are referred to as "segment end portion surfaces 32," and the vacuum suction holes 13 are provided on the segment end portion surfaces 32.

A surface of the second segment 30 which surface is coupled to the adjacent first segment 20 is referred to as a "segment side surface 33." Each of both segment side surfaces 33 has a shape that faces a direction inclined downward relative to the horizontal direction. To be specific, both segment side surfaces 33 are inclined such that the width of the second segment 30 increases from a rear side of the second segment 30 toward the segment front surface 31.

As described below, in the present embodiment, when assembling the mandrel 11 in a cylindrical shape, the second segments 30 are first fixed to the support rings 12, and each of the first segments 20 is then fitted between the second segments 30. Therefore, in order not to hinder the fitting work of the first segment 20, it is preferable that the area of the rear side of the second segment 30 fixed first be small. On this account, it is preferable that each of both segment side surfaces 33 of the second segment 30 be formed such that the normal direction of the segment side surface 33 extends downward (direction shown by an arrow Ar3 in FIG. 3B), in other words, the segment side surface 33 is inclined downward.

In order to couple the segment side surface 33 to the segment side surface 23 of the first segment 20, a coupling member (not shown) is provided on the segment side surface 33. A surface of the second segment 30 which surface constitutes the end surface of the mandrel 11 is referred to as a "segment end surface 34." In order to fix the segment end surface 34 to the support ring 12, a fixing member (not shown) is provided on the segment end surface 34 as with the segment end surface 24 of the first segment 20.

An eave portion 35 projecting outward from the segment side surface 33 is provided at an edge portion of the segment side surface 33 of the second segment 30, the edge portion being connected to the segment front surface 31. Therefore, as shown in FIGS. 3A and 3B, when the second segment 30 is viewed from the segment front surface 31, the segment side surfaces 33 facing downward are completely hidden by the eave portions 35.

The degree of the downward inclination of the segment side surface 33 and the degree of the projection of the eave portion 35 are not especially limited and are suitably set in accordance with the specific configuration of the mandrel 11, the specific configuration of the second segment 30, or the specific configuration of the first segment 20 coupled to the second segment 30.

Figure 3B:
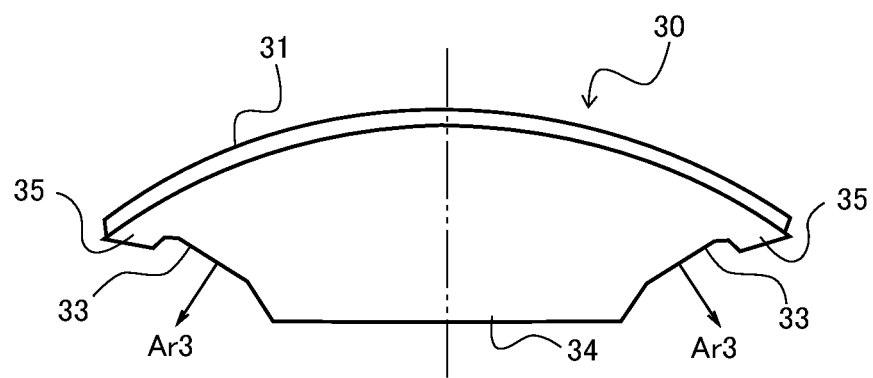
FIG. 3B is a surface view showing an end portion of the second segment shown in FIG. 3A.

As shown in FIG. 3B, an end surface of the eave portion 35 constitutes a part of the segment side surface 33. Therefore, the segment side surface 33 of the second segment 30 is constituted by two surfaces that are a main body side surface of the second segment 30 and the end surface of the eave portion 35 projecting from the main body side surface. However, the specific configuration of the segment side surface 33 is not especially limited, and the segment side surface 33 may be constituted by a single surface without a level difference or may be constituted by three or more surfaces.

In the present embodiment, the end surface of the eave portion 35 in the segment side surface 33 is coupled to a part of the segment side surface 23 of the first segment 20 (see the parts Ps in FIG. 1B). The below-described seal structure is provided on the part of the segment side surface 23 to which part the end surface of the eave portion 35 is coupled. Therefore, the segment side surface 23 of the segment 20 and the segment side surface 33 of the segment 30 do not have to be entirely coupled to each other, and as in the present embodiment, a part of the segment side surface 23 and a part of the segment side surface 33 may be coupled to each other.

Molding of Composite Material Structure

Next, one example of a method of molding (manufacturing) the composite material structure by using the above-described mold 10 will be specifically explained with reference to FIGS. 4 and 5A to 5C.

First, as described above, regarding the mold 10 (see FIG. 1A), the six segments 20 and 30 are fixed to the support rings 12 to be assembled as the mandrel 11 that is a single cylindrical structure.

Before the six segments 20 and 30 are assembled as the mandrel 11, some of parts constituting the composite material structure are attached to the six segments 20 and 30. For example, as described above, the groove-shaped concave portions (not shown) are provided on the segment front surfaces 21 of the segments 20 and the segment front surfaces 31 of the segments 30, and stiffeners, such as stringers, are attached to the groove-shaped concave portions. After such parts are attached to the segments 20 and 30, the segments 20 and 30 are assembled to construct the mandrel 11.

Figure 4:
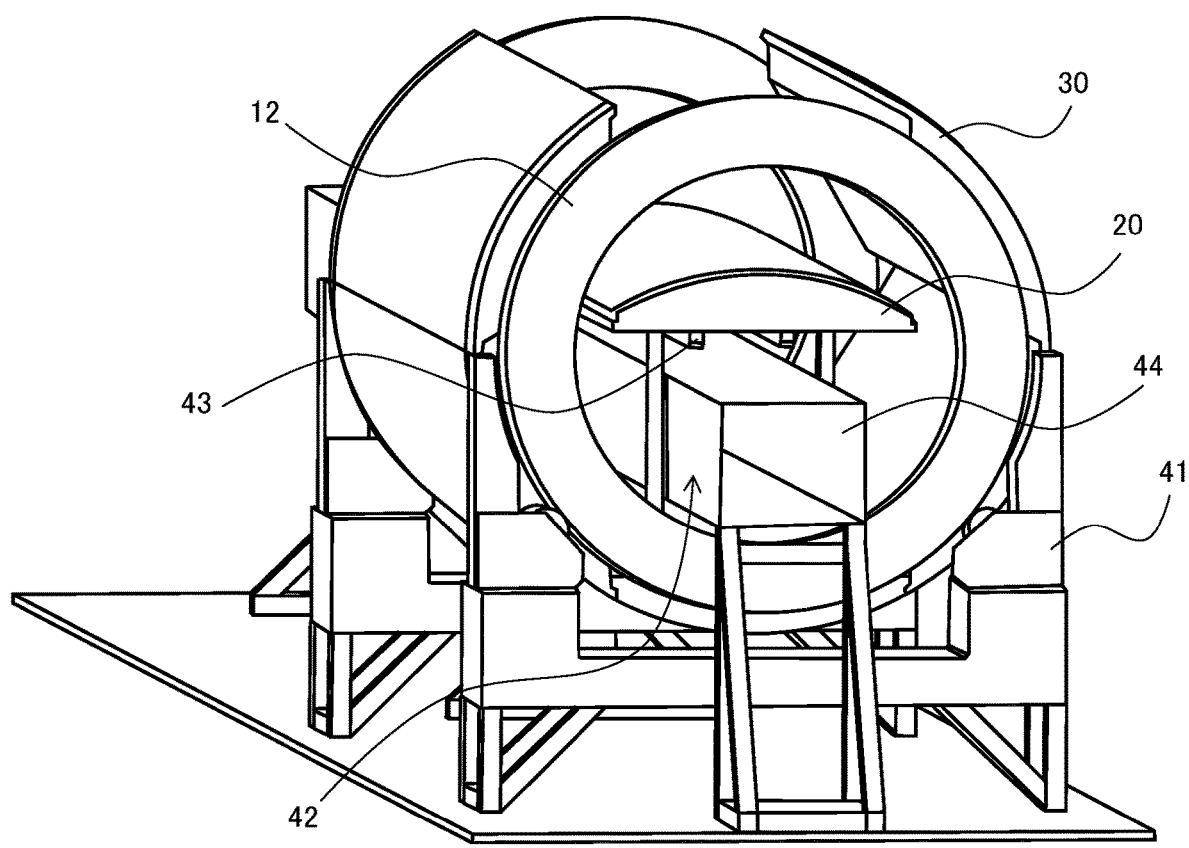
FIG. 4 is a schematic perspective view showing one example of assembling of the mold for manufacturing the composite material structure shown in FIG. 1A.

As shown in FIG. 4, the support rings 12 are supported in a standing state by respective cradles 41 (mandrel support structures) so as to be rotatable. Each of the cradles 41 includes a plurality of support rollers configured to rotate the support ring 12. A pair of support rings 12 are supported by a pair of cradles 41. A precision rail 42 (mandrel assembling/ disassembling apparatus) is provided at a position between the support rings 12 and corresponding to the hollow portions of the annular support rings 12.

The precision rail 42 is an assembling apparatus by which the six segments 20 and 30 are fixed and assembled to the support rings 12. As shown in FIG. 4, the precision rail 42 includes a jack portion 43, a rail main body 44, and the like. One first segment 20 or one second segment 30 is placed on an upper side of the jack portion 43, and the jack portion 43 lifts the first segment 20 or the second segment 30 in a direction of 12 o'clock, i.e., upward. The rail main body 44 supports the jack portion 43 and the like and includes, for example, a drive mechanism configured to drive the jack portion 43.

As described above, in the present embodiment, when assembling the six segments 20 and 30 as the mandrel 11 that is a single structure, first, the three second segments 30 are fixed to the support rings 12.

For example, the first one of the three second segments 30 is placed on the jack portion 43, and the jack portion 43 lifts the second segment 30 in the direction of 12 o'clock (vertically upper direction) such that the second segment 30 reaches an upper position of the support rings 12. In this state, the segment end surfaces 34 of the second segment 30 are fixed to respective inner surfaces (fixing surfaces) of the support rings 12 by the fixing members (not shown).

After that, the support rings 12 are rotated by the cradles 41 by about 120 degrees corresponding to two segments. With this, the second segment 30 fixed at the upper position in FIG. 4 is moved to a lower position, and therefore, nothing is fixed at the upper position. Then, the second one and third one of the three second segments 30 are fixed to the support rings 12 and rotated in the same manner as the first one of the three second segments 30. After the third one of the second segments 30 is fixed, the support rings 12 are rotated by about 60 degrees corresponding to one segment. With this, the three second segments 30 are fixed at every other fixing positions of the support rings 12.

Then, the first one of the three first segments 20 is placed on the jack portion 43, and the jack portion 43 lifts the first segment 20 in the direction of 12 o'clock (vertically upper direction) such that the first segment 20 reaches the upper position of the support rings 12. In this state, the first segment 20 is inserted between the two second segments 30 fixed in advance. The segment end surfaces 34 of the first segment 20 are fixed to the respective inner surfaces (fixing surfaces) of the support rings 12, and the segment side surfaces 23 of the first segment 20 are coupled to the segment side surfaces 33 of the second segments 30 by the coupling members (not shown).

After that, the support rings 12 are rotated by the cradle 41 by about 120 degrees corresponding to two segments. With this, the first segment 20 fixed at the upper position in FIG. 4 is moved to the lower position, and therefore, nothing is fixed at the upper position. Then, the second one and third one of the three first segments 20 are fixed to the support rings 12 in the same manner as the first one of the three first segments 20 and are coupled to the adjacent second segments 30. With this, the mandrel 11 that is a single structure is assembled between the support rings 12. It should be noted that FIG. 4 shows that the third one (last one) of the three first segments 20 is placed on the jack portion 43.

Figure 5A:
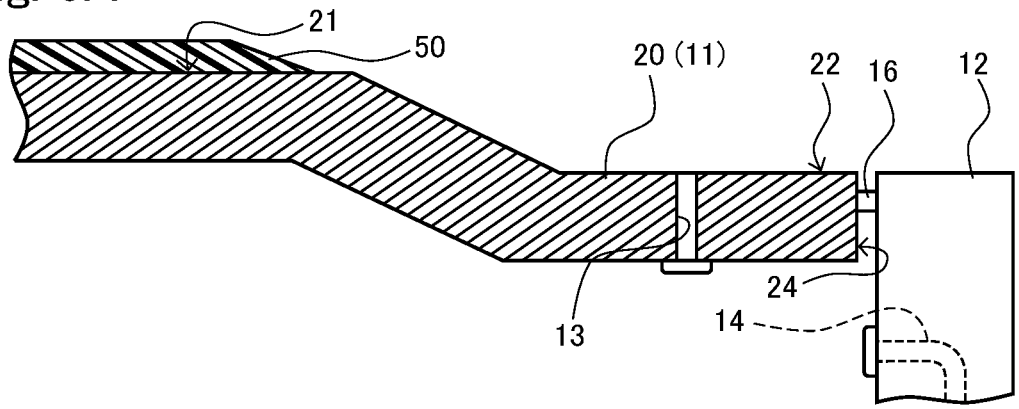
FIGS. 5A to 5C are partial sectional views each showing one end portion of the first segment of the mold for manufacturing the composite material structure shown in FIG. 1A and schematically show a part of a process of manufacturing the cylindrical composite material structure by using the mold.

After the mold 10 is constructed as above, a prepreg 50 is laminated on the outer peripheral surface of the mandrel 11 as shown in FIG. 5A. The method of laminating the prepreg 50 is not especially limited. Typically, by an automatic lamination apparatus including a lamination roller, the prepreg 50 is laminated by being attached to the mandrel 11 while rotating the mandrel 11.

Figure 5B:
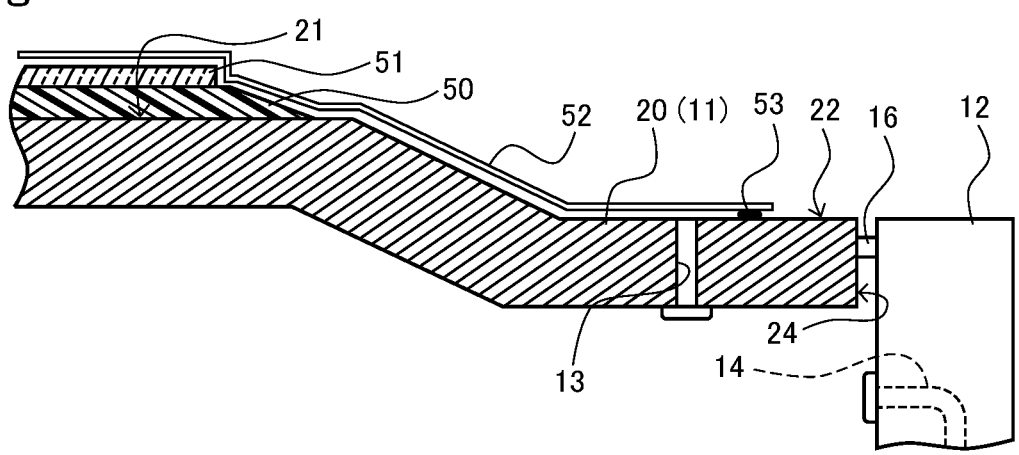
Figure 5C:
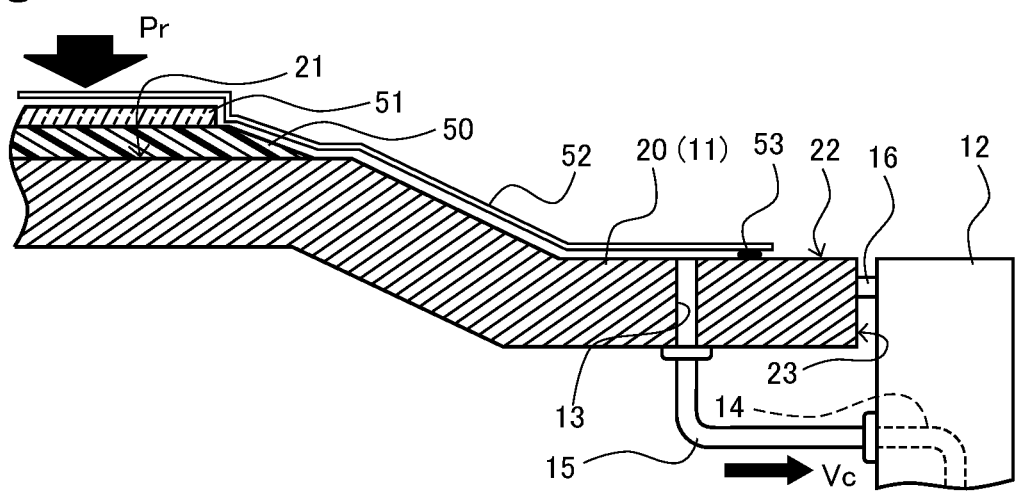

FIGS. 5A to 5C schematically show a part of a section of an end portion of the first segment 20 constituting the mandrel 11. Basically, the second segment 30 has the same configuration as FIGS. 5A to 5C. Therefore, the configuration of the first segment 20 explained with reference to FIGS. 5A to 5C corresponds to the configuration of the second segment 30 unless otherwise noted.

As schematically shown in FIGS. 5A to 5C, since the segment front surface 21 constitutes the outer peripheral surface of the mandrel 11, the prepreg 50 is laminated on the segment front surface 21. As described above, the segment end surface 24 of the first segment 20 is fixed by a fixing member 16. Further, as described above, the vacuum suction holes 13 are provided on the segment end portion surface 22 of the first segment 20. As shown by broken lines in FIGS. 5A to 5C, a vacuum suction pipe 14 is provided at the support ring 12.

After the lamination of the prepreg 50 is completed, a caul plate 51 is attached onto the prepreg 50 as shown in FIG. 5B. Further, a bagging film 52 is provided so as to cover the entire prepreg 50 (and the caul plate 51), and an entire peripheral portion of the bagging film 52 is sealed by a bonding member 53 (for example, a tackey tape). With this, a vacuum bag is formed on the outer peripheral surface of the mold 10. At this time, the bagging film 52 covers not only the segment front surface 21 (the outer peripheral surface of the mandrel 11) on which the prepreg 50 is laminated but also a region of the segment end portion surface 22 at which region the vacuum suction holes 13 are provided.

After the vacuum bag is formed, the mold 10 is accommodated in an autoclave, and the prepreg 50 is subjected to a hardening treatment at a predetermined temperature under predetermined pressure. Before the mold 10 is accommodated in the autoclave, as shown in FIG. 5C, one end of a connection hose 15 is connected to the vacuum suction hole 13 from a rear surface of the first segment 20. The other end of the connection hose 15 is connected to the vacuum suction pipe 14 provided at the support ring 12. With this, as shown by a block arrow Vc in FIG. 5C, the inside of the vacuum bag can be subjected to vacuum suction through the vacuum suction hole 13.

When the hardening treatment is started in the autoclave, the predetermined pressure is applied to the vacuum bag by the autoclave from the outside of the mandrel 11 as shown by a block arrow Pr in FIG. 5C and is heated at the predetermined temperature. As described above, since the inside of the vacuum bag is subjected to the vacuum suction, the prepreg 50 is compressed while being heated. With this, the stiffener provided on the outer peripheral surface of the mandrel 11 and the skin formed by curing the prepreg 50 strongly stick together to be integrated with each other. Thus, the composite material structure is molded.

After the hardening treatment is terminated, the mold 10 is carried out of the autoclave, and the bagging film 52 and the caul plate 51 are detached. After that, the composite material structure supported by the mandrel 11 is subjected to trimming and perforation. Then, the mold 10 is removed from the composite material structure. When removing the mold 10, the mandrel 11 is disassembled in the reverse order to the above-described method of assembling the mandrel 11, and the six segments 20 and 30 are removed from the inside of the composite material structure. Thus, the composite material structure is manufactured.

Seal Structure

Next, the seal structure provided between the first segment 20 and the second segment 30 constituting the mandrel 11 will be specifically explained with reference to FIGS. 6A to 7F.

Figure 6A:
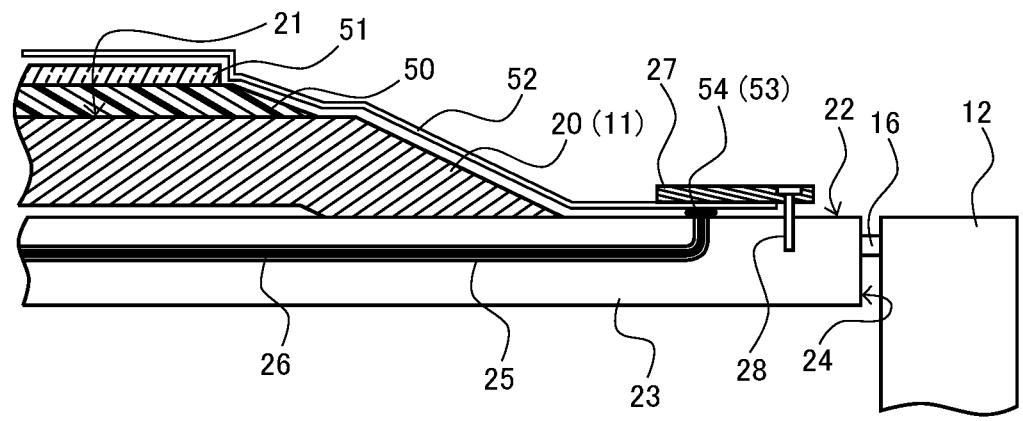
FIGS. 6A and 6B are partial sectional views each showing the mold for manufacturing the composite material structure shown in FIG. 1A and show one example of a seal structure according to the present embodiment, the seal structure being applied to the mold.
Figure 6B:
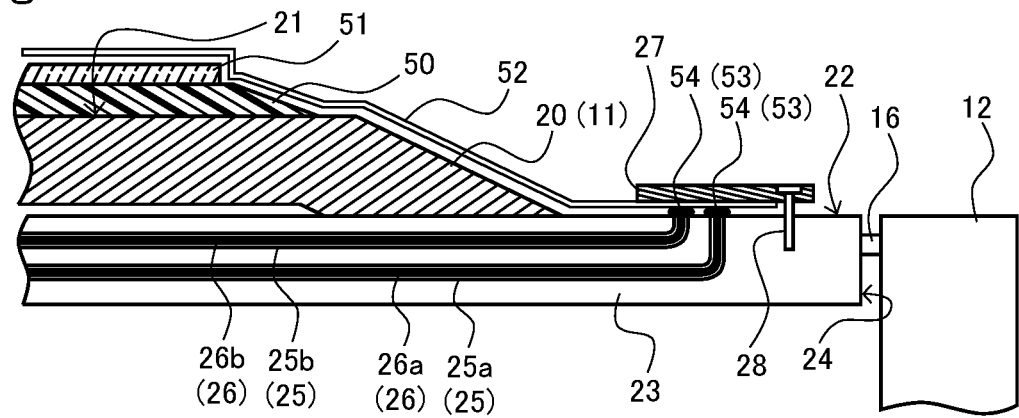

The seal structure according to the present embodiment is provided between the adjacent segments 20 and 30. As shown in FIGS. 6A and 6B, the seal structure is constituted by at least the seal groove 25 and a seal member 26. As shown in FIGS. 7A to 7F, the seal member 26 includes: a lip portion 262 or 265 projecting outward; and a hollow portion 263 therein or a concave portion 264 or 266 on an outer peripheral surface thereof.

The seal groove 25 is provided on at least one of the adjacent segment side surfaces 23 and 33 of the segments 20 and 30 and extends along a longitudinal direction of the segment side surface 23 or 33. In the present embodiment, the seal groove 25 is provided on each of the segment side surfaces 23 of the first segment 20 and is not provided on any of the segment side surfaces 33 of the second segment 30. As described above, the segment side surface 23 of the first segment 20 faces the horizontal direction or the direction inclined upward relative to the horizontal direction. Therefore, the seal structure is provided more easily on the segment side surface 23 of the first segment 20 than on the segment side surface 33 of the second segment 30.

FIGS. 6A and 6B schematically show only one end portion of the first segment 20 as a part of the mandrel 11. Although not shown, the other end portion of the first segment 20 has the same configuration as FIG. 6A or 6B. In FIGS. 6A and 6B, since the segment side surface 23 on which the seal groove 25 is provided is visible from a lateral side of the first segment 20, the segment side surface 23 is shown as a schematic partial side view. However, in FIGS. 6A and 6B, in order to explain the lamination of the prepreg 50 on the segment front surface 21 and the formation of the vacuum bag, the vicinity of the segment front surface 21 is shown as a schematic partial sectional view as with FIGS. 5B and 5C.

The seal member 26 is inserted in the seal groove 25. The seal member 26 seals between the adjacent segments 20 and 30 by coupling the side surfaces of the segments 20 and 30 to each other. When the adjacent segments 20 and 30 are coupled to each other, a predetermined clearance is kept between the segment side surface 23 and the segment side surface 33. With the clearance kept, the seal member 26 is crushed by being brought into contact with the segment side surface 23 or the segment side surface 33. Thus, a sealed state between the segments 20 and 30 is realized.

The seal member 26 used in the present embodiment is not formed in an annular shape but is formed in a line shape having ends. The seal member 26 having such line shape can be easily produced by, for example, extrusion molding at low cost. Since the seal member 26 is disposable, i.e., is basically used once in the autoclave and thrown away, the increase in the manufacturing cost of the composite material structure can be avoided by avoiding the increase in the manufacturing cost of the seal member 26.

As shown in FIG. 6A, at least one seal groove 25 is only required to be formed on the segment side surface 23. However, as shown in FIG. 6B, two seal grooves 25 that are an outer seal groove 25a and an inner seal groove 25b may be formed on the segment side surface 23. Although not shown, three or more seal grooves 25 may be formed on the segment side surface 23. Further, when a plurality of seal grooves 25 are formed, the seal members 26 of the same type may be inserted in the seal grooves 25, or the seal members 26 of different types may be inserted in the seal grooves 25. For example, according to the configuration shown in FIG. 6B, a first seal member 26a is inserted into the outer seal groove 25a, and a second seal member 26b different from the first seal member 26a is inserted into the inner seal groove 25b. It should be noted that the configuration of an end portion of the seal member 26 will be described later.

As described above, the seal member 26 includes: the lip portion 262 or 265; and at least one of the hollow portion 263 and the concave portions 264 and 266. The specific configurations of the lip portions 262 and 265, the hollow portion 263, and the concave portions 264 and 266 are not especially limited. However, the seal members 26A to 26F in FIGS. 7A to 7F are shown as typical examples.

Figure 7A:
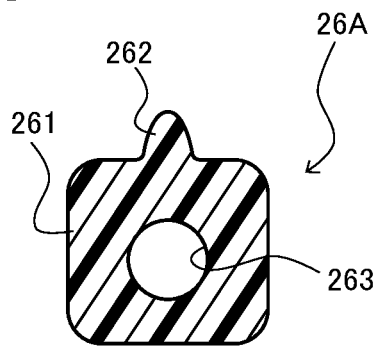
FIGS. 7A to 7F are cross sectional views showing typical examples of a seal member included in the seal structure shown in FIG. 6A or 6B.

As shown in FIG. 7A, the seal member 26A includes: the hollow portion 263 in a seal main body 261 thereof; and an upright lip portion 262 on an outer peripheral surface thereof. A part of the seal main body 261 of the seal member 26A which part contacts a bottom surface of the seal groove 25 when the seal member 26A is inserted in the seal groove 25 is referred to as a seal bottom portion, and a part of the seal main body 261 of the seal member 26A which part is opposed to the seal bottom portion is referred to as a seal upper portion. The upright lip portion 262 is provided so as to project from the substantially flat seal upper portion in a substantially normal direction of the seal upper portion. With the seal member 26A inserted in the seal groove 25, at least a tip end of the upright lip portion 262 projects to the outside of the seal groove 25. A cross section of the seal main body 261 of the seal member 26A has a rectangular shape, and the seal bottom portion is a substantially flat surface.

Figure 7B:
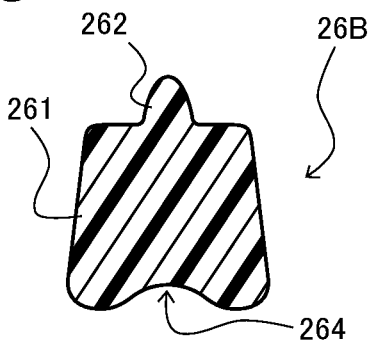

As shown in FIG. 7B, the seal member 26B includes the upright lip portion 262 as with the seal member 26A. The seal member 26B does not include the hollow portion 263 but includes a bottom surface concave portion 264 at the seal bottom portion thereof. The cross section of the seal main body 261 of the seal member 26B has a substantially trapezoidal shape, and the width of the seal upper portion is smaller than the width of the seal bottom portion.

As above, according to the seal members 26A and 26B, the upright lip portion 262 is included at the seal upper portion, and the hollow portion 263 is included in the seal main body 261, or the bottom surface concave portion 264 is included at the seal bottom portion. Each of the hollow portion 263 and the bottom surface concave portion 264 serves as a thinned part in the seal main body 261. Therefore, when the adjacent segment side surfaces 23 and 33 of the segments 20 and 30 are coupled to each other, each of the hollow portion 263 and the bottom surface concave portion 264 is easily crushed by being pressed by the segment side surface 33 of the second segment 30.

The upright lip portion 262 projects outward (in a direction toward the second segment 30) from the segment side surface 23 of the first segment 20 and has elasticity derived from the material of the seal member 26A or 26B. Therefore, the upright lip portion 262 tries to stand in a state of being coupled to the segment side surface 33. With this, the inside of the seal groove 25 is satisfactorily sealed by the seal main body 261 and the upright lip portion 262.

At this time, when viewing the seal members 26A and 26B from above, the hollow portion 263 or the bottom surface concave portion 264 is located substantially immediately under the upright lip portion 262, so that the hollow portion 263 or the bottom surface concave portion 264 which is easily crushed and the upright lip portion 262 which is biased in the standing direction by the elasticity are located on the substantially same straight line. Therefore, when assembling the mandrel 11, the seal members 26A and 26B can be compressed without applying a high load, and a satisfactory sealed state can be realized between the adjacent segments 20 and 30. As a result, the segments 20 and 30 can be moved by a low load while securing the satisfactory sealed state, and therefore, the positions of the outer peripheral surfaces of the adjacent segments 20 and 30 can be easily adjusted.

According to the seal member 26A shown in FIG. 7A and the seal member 26B shown in FIG. 7B, the upright lip portion 262 in a substantially upright state is included, and the hollow portion 263 or the bottom surface concave portion 264 as a deformation structure by which the seal main body 261 is crushed in a cross sectional direction is located along the upright lip portion 262 on the substantially same straight line as the upright lip portion 262. However, the seal member 26 according to the present embodiment is not limited to this configuration. For example, as shown in FIGS. 7C to 7F, an inclined lip portion 265 may be included instead of the upright lip portion 262.

Figure 7C:
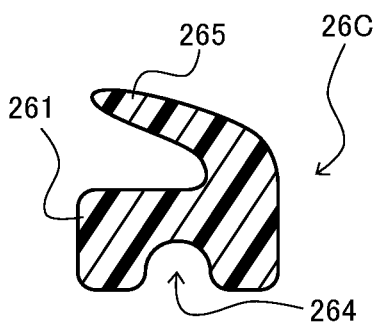

For example, as shown in FIG. 7C, the seal member 26C includes the inclined lip portion 265 at the seal upper portion thereof. The inclined lip portion 265 projects so as to be inclined relative to the normal direction of the seal upper portion. A direction connecting the seal bottom portion and the seal upper portion in the cross section of the seal main body 261 is referred to as a "vertical direction of the cross section of the seal member 26," and a direction perpendicular to the vertical direction is referred to as a "lateral direction of the cross section of the seal member 26." Unlike the seal members 26A and 26B, the cross section of the seal main body 261 of the seal member 26C has a "laterally long" shape, not a "vertically long" shape that extends over the entire cross section of the seal groove 25.

Therefore, in the seal member 26C, a movable space in which the inclined lip portion 265 is movable in an upper-lower direction is formed between the inclined lip portion 265 and the seal main body 261. As with the seal member 26B, the bottom surface concave portion 264 is formed at the seal bottom portion of the seal member 26C. In addition, the movable space can also be regarded as a concave portion provided on the outer peripheral surface of the seal member 26C.

Figure 7D:
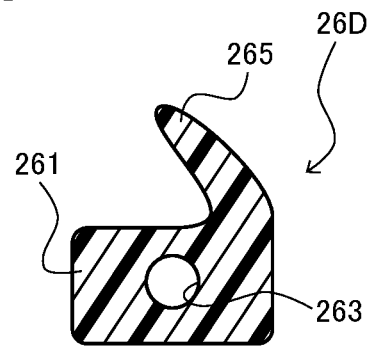

As shown in FIG. 7D, as with the seal member 26C, the seal member 26D includes the inclined lip portion 265, and the cross section of the seal main body 261 has a "laterally long" shape. However, the seal member 26D includes the hollow portion 263 instead of the bottom surface concave portion 264.

As above, according to the seal members 26C and 26D, the inclined lip portion 265 is included at the seal upper portion, and the bottom surface concave portion 264 is included at the seal bottom portion of the seal main body 261 having a "laterally long" cross section, or the hollow portion 263 is included in the seal main body 261. When the adjacent segment side surfaces 23 and 33 of the segments 20 and 30 are coupled to each other, the inclined lip portion 265 is easily pressed downward by the existence of the movable space immediately under the inclined lip portion 265, but the inclined lip portion 265 tries to stand by its elasticity in a state of contacting the segment side surface 33. Further, according to the seal main body 261 that is "laterally long," the bottom surface concave portion 264 or the hollow portion 263 is crushed in accordance with the pressing of the inclined lip portion 265. With this, the inside of the seal groove 25 is satisfactorily sealed by the seal main body 261 and the inclined lip portion 265.

Further, the seal member 26 according to the present embodiment may include the inclined lip portion 265, and the width of the seal upper portion may be larger than the width of the seal bottom portion.

Figure 7E:
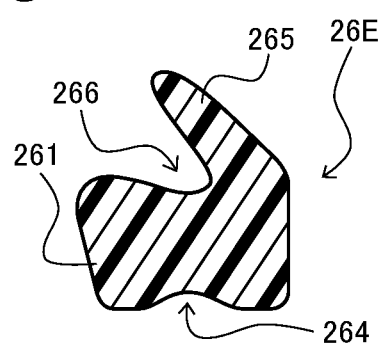

For example, as shown in FIG. 7E, the seal member 26E includes the inclined lip portion 265, and the bottom surface concave portion 264 is formed at the seal bottom portion. In addition, the width of the seal upper portion is larger than the width of the seal bottom portion, and an upper surface concave portion 266 is formed at a position of the seal upper portion which position is adjacent to the inclined lip portion 265.

Figure 7F:
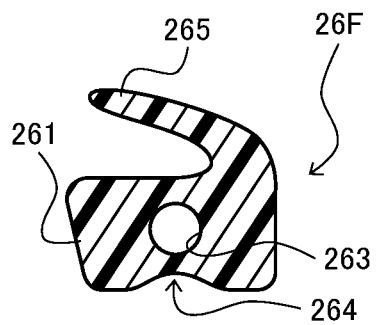

Further, as shown in FIG. 7F, the seal member 26F includes the inclined lip portion 265, and the bottom surface concave portion 264 is formed at the seal bottom portion. In addition, the width of the seal upper portion is larger than the width of the seal bottom portion, and the hollow portion 263 is formed in the seal main body 261.

As above, according to the seal members 26E and 26F, the inclined lip portion 265 is included at the seal upper portion larger in width than the seal bottom portion, and the bottom surface concave portion 264 is included at the seal bottom portion, or the hollow portion 263 is included in the seal main body 261. When the adjacent segment side surfaces 23 and 33 of the segments 20 and 30 are coupled to each other, the inclined lip portion 265 is easily pressed downward by the existence of the movable space immediately under the inclined lip portion 265, but the inclined lip portion 265 tries to stand by its elasticity in a state of contacting the segment side surface 33. Further, according to the seal main body 261, the bottom surface concave portion 264 or the hollow portion 263 is crushed in accordance with the pressing of the inclined lip portion 265. In addition, since the seal upper portion is wide, the seal groove 25 can be satisfactorily sealed in a width direction thereof.

Especially, when the upper surface concave portion 266 is formed in addition to the movable space as in the seal member 26E, or when the hollow portion 263 is formed in addition to the movable space as in the seal member 26F, an edge portion of the wide seal upper portion easily moves toward an inner side of the seal main body 261 by the deformation of the upper surface concave portion 266 or the hollow portion 263. Therefore, the sealed state in the lateral direction of the cross section can be improved by the wide seal upper portion. With this, the inside of the seal groove 25 is satisfactorily sealed by the seal main body 261, the inclined lip portion 265, and the wide seal upper portion.

The selection from the seal members 26A to 26F shown in FIGS. 7A to 7F is not especially limited. The seal member 26 having a preferred cross-sectional shape can be selected depending on various conditions, such as the degree of the seal performance required for the seal structure, the material of the seal member 26, and moving loads of the segments 20 and 30. Further, as described below, when a plurality of seal grooves 25 are formed on the segment side surface 23, the seal members 26 having different cross sections can be selected depending on conditions required for the respective seal grooves 25.

For example, according to the configuration shown in FIG. 6B, one of the seal members 26C to 26F each including the inclined lip portion 265 can be used as the first seal member 26a inserted in the outer seal groove 25a, and the seal member 26A or 26B including the upright lip portion 262 can be used as the second seal member 26b inserted in the inner seal groove 25b.

High pressure is applied from the outside of the seal groove 25 by the autoclave. Therefore, any one of the seal members 26C to 26F is arranged in the outer seal groove 25a such that the pressure is applied to the movable region located immediately under the inclined lip portion 265. With this, the inclined lip portion 265 can be strongly biased toward the standing side by not only the elasticity derived from the material but also the pressure difference. Thus, the further satisfactory sealed state can be realized.

The inside of the seal groove 25 faces the inside of the vacuum bag. In thermal curing by the autoclave, the matrix resin (thermosetting resin) constituting the prepreg 50 is once softened before being cured. At this time, there is a possibility that the softened matrix resin flows toward the seal groove 25. Therefore, it is preferable that the leak of the matrix resin be effectively prevented or suppressed.

To be specific, the second seal member 26b inserted in the inner seal groove 25b is required to have performance (pressure seal performance) of redundantly sealing high pressure outside the vacuum bag, together with the first seal member 26a inserted in the outer seal groove 25a. In addition, the second seal member 26b inserted in the inner seal groove 25b is required to have performance (matrix resin seal performance) of preventing the leak of the softened matrix resin in the vacuum bag. Therefore, the seal member 26A or 26B including the upright lip portion 262 is arranged in the inner seal groove 25b.

According to the seal member 26, the high pressure outside the vacuum bag can be satisfactorily sealed (the satisfactory pressure seal performance can be realized) by the crushed upright lip portion 262. In addition, since the movable region and the upper surface concave portion 266 are not provided around the upright lip portion 262, the upright lip portion 262 does not incline unlike the inclined lip portion 265. Therefore, the softened matrix resin generated in the vacuum bag can be satisfactorily stopped (the satisfactory matrix resin seal performance can be realized) by the upright lip portion 262. In addition, since the upper surface concave portion 266 and the like are not included as described above, the matrix resin can be prevented from staying in a concave portion at an outer periphery of the seal member 26.

Configuration of End Portion of Seal Member

Next, a preferred configuration of the end portion of the seal member 26 in the seal structure configured as above will be specifically explained with reference to FIGS. 6A, 6B, and 8A to 9D.

In the seal structure according to the present embodiment, the seal member 26 inserted in the seal groove 25 is formed in a line shape having ends, not an annular shape. As described above, regarding the cross sectional direction of the seal member 26, by the lip portions 262 and 265, the hollow portion 263, and the concave portions 264 and 266 (see FIGS. 7A to 7F), the sealed state can be formed by compressing the seal member 26 without applying a high load. On the other hand, regarding the longitudinal direction of the seal member 26, the expansion (linear expansion) generated in the longitudinal direction by the heating during the autoclaving can be easily adjusted by both end portions of the seal member 26.

Specifically, for example, as shown in FIGS. 6A and 6B, the linear expansion of the seal member 26 can be adjusted only by pressing a seal end portion pressing member 27 against the end portion of the seal member 26 such that the end portion is not exposed. The seal groove 25 may have a line shape including an end portion that reaches the segment end surface 24. However, as shown in FIGS. 6A and 6B, it is preferable that the end portion of the seal groove 25 be bent toward the segment end portion surface 22. With this, an opening of the end portion of the seal groove 25 is exposed on the segment end portion surface 22 of the first segment 20, and therefore, the seal end portion pressing member 27 can be provided on the segment end portion surface 22.

The segment end surface 24 of the first segment 20 is fixed to the support ring 12 through the fixing member 16. Therefore, if the seal end portion pressing member 27 is provided on the segment end surface 24, this may influence the movement of the first segment 20 during the assembling of the mandrel 11 or the fixing of the first segment 20 to the support ring 12. However, since the seal end portion pressing member 27 is provided on the segment end portion surface 22, such influences on the assembling of the mandrel 11 can be avoided.

Further, as shown in FIGS. 6A and 6B, an edge portion of the bagging film 52 constituting the vacuum bag reaches the segment end portion surface 22. When the end portion of the seal member 26 reaches the segment end portion surface 22, the bagging film 52 also covers an upper side of the end portion of the seal member 26, and the seal end portion pressing member 27 can press the end portion of the seal member 26 from above.

Figure 8A:
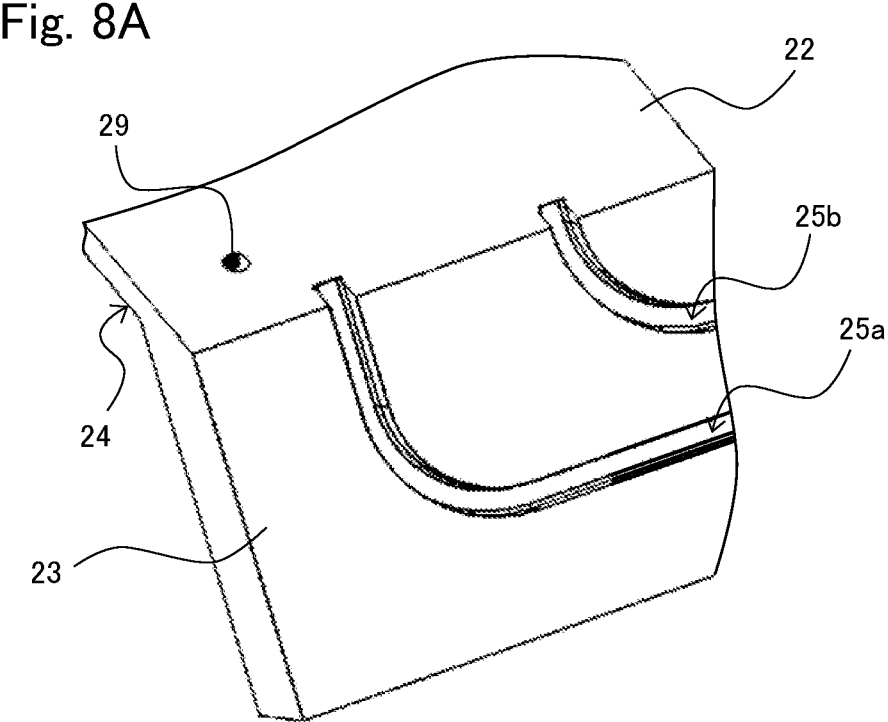
FIG. 8A is a partial perspective view of the first segment and shows that a seal end portion pressing member included in the seal structure shown in FIG. 6A or 6B is not attached yet.
Figure 8B:
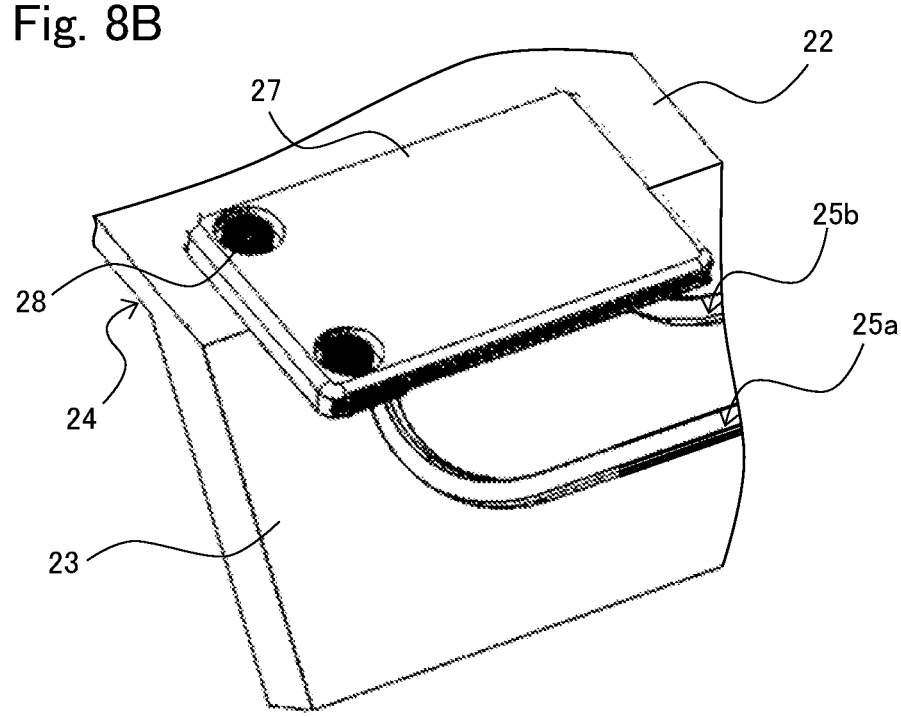
FIG. 8B is a partial perspective view of the first segment and shows that the seal end portion pressing member is attached to the first segment shown in FIG. 8A.

The specific configuration of the seal end portion pressing member 27 is not especially limited. As shown in FIGS. 6A, 6B, and 8B, the seal end portion pressing member 27 is only required to be a plate-shaped member having rigidity and be fixed to the segment end portion surface 22 of the first segment 20 by a known fastening member 28 (for example, a bolt). When the seal end portion pressing member 27 has rigidity, the seal end portion pressing member 27 can be pressed against the end portion of the seal member 26 by fixing only one of both end portions of the seal end portion pressing member 27 with the fastening member 28 such that the end portion of the seal member 26 is not exposed. With this, as shown in FIGS. 6A, 6B, and 8A, a fastening member insertion hole 29 (shown only in FIG. 8A) can be provided at a position closer to the segment end surface 24 than the seal groove 25. Therefore, for example, an opening portion for the fastening member 28 does not have to be formed on the bagging film 52, and therefore, the degree of vacuum of the vacuum bag can be prevented from deteriorating.

As described above, the cross section of the seal member 26 includes the lip portion 262 or 265, the hollow portion 263, the concave portion 264 or 266, and the like (see FIGS. 7A to 7F). Therefore, even when the seal member 26 is inserted in the seal groove 25, a gap is necessarily formed between the opening of the end portion of the seal groove 25 exposed on the segment end portion surface 22 and the end portion of the seal member 26. On this account, as shown in FIGS. 6A and 6B, the opening of the end portion of the seal groove 25 and the end portion of the seal member 26 are only required to be covered with a bonding member 54 (for example, a tackey tape) and then pressed by the seal end portion pressing member 27.

Especially when a plurality of seal grooves 25 are provided, and a plurality of seal members 26 are used, the end portions of the seal members 26 are covered with the bonding member 54, and with this, the end portions of the seal members 26 are connected to one another, and therefore, the seal members 26 can be formed as a single seal member. Thus, the more satisfactory and stable sealed state can be realized between the adjacent segments 20 and 30.

As described above, the bonding member 53 seals the entire peripheral portion of the bagging film 52. The bonding member 53 needs to be connected to the bonding member 54 covering the end portion of the seal member 26. With this, the vacuum bag sealed by the bonding members 53 and 54 and the seal member 26 is formed. In the schematic sections shown in FIGS. 6A and 6B, only the bonding member 54 is shown. However, in order to indicate that the bonding member 53 is connected to the bonding member 54, the reference sign 53 with parentheses is also shown.

Next, one example of the adjustment of the end portions of the seal members 26 by the seal end portion pressing member 27 will be explained by using an example in which as shown in FIGS. 6B, 8A, and 8B, the outer seal groove 25*a* and the inner seal groove 25*b* are provided as the seal grooves 25, and the first seal member 26*a* and the second seal member 26*b* are used as the seal members 26.

Figure 9A:
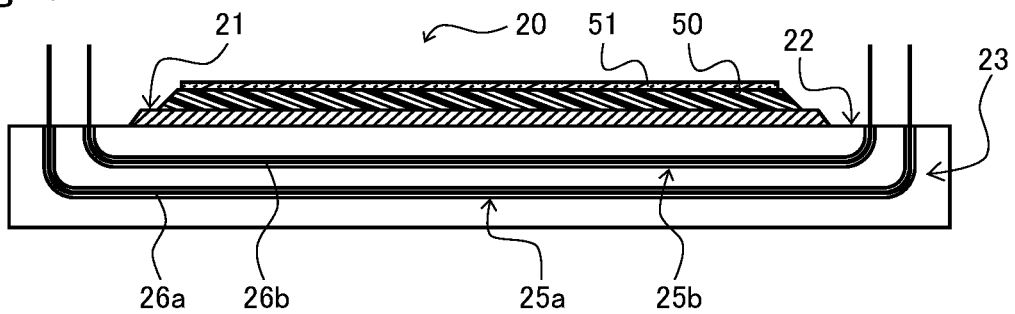
FIGS. 9A to 9D are schematic process diagrams showing a process of constructing the seal structure shown in FIG. 6B.

First, as schematically shown in FIG. 9A, the first seal member 26*a* is inserted in the outer seal groove 25*a* formed on the segment side surface 23 of the first segment 20, and the second seal member 26*b* is inserted in the inner seal groove 25*b* formed on the segment side surface 23 of the first segment 20. Both end portions of the first seal member 26*a* and both end portions of the second seal member 26*b* are exposed from the openings of the end portions of the outer seal groove 25*a* and the openings of the end portions of the inner seal groove 25*b* on the segment end portion surface 22. It should be noted that the prepreg 50 is laminated on the segment front surface 21, and the caul plate 51 is placed on the prepreg 50.

Figure 9B:
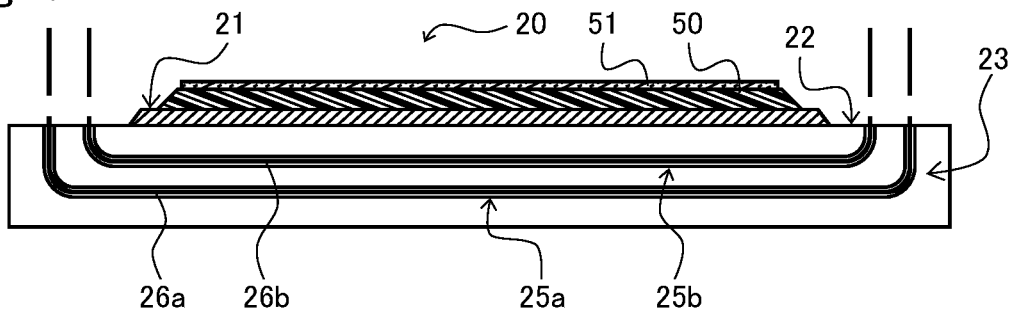
Figure 9C:
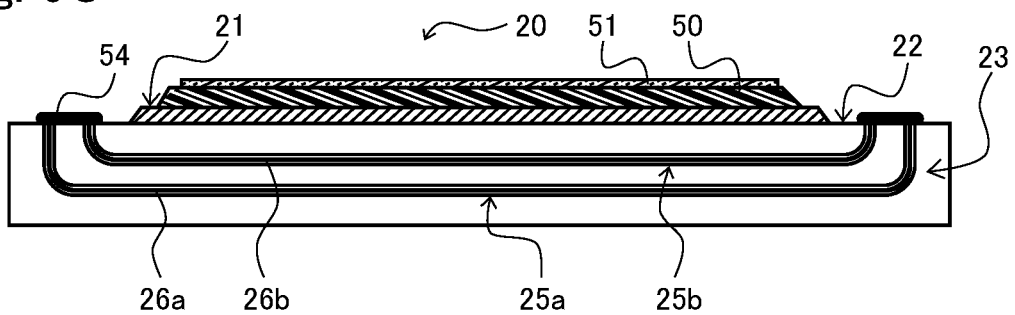

Next, as shown in FIG. 9B, each of both end portions of the first seal member 26*a* exposed from the openings of the end portions of the outer seal groove 25*a* and both end portions of the second seal member 26*b* exposed from the openings of the end portions of the inner seal groove 25*b* is cut so as to have a length of about several millimeters from the segment end portion surface 22. Then, as shown in FIG. 9C, each of the bonding members 54 cover the opening of the end portion of the outer seal groove 25a and the opening of the end portion of the inner seal groove 25b so as to connect the end portion of the first seal member 26a and the end portion of the second seal member 26b to each other. With this, the first seal member 26a and the second seal member 26b can be regarded as a single seal member. The single seal member has an annular structure in appearance.

Figure 9D:
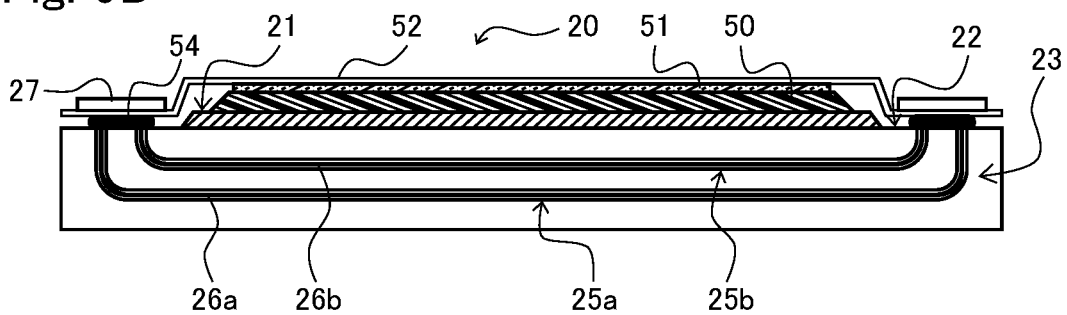

After that, as shown in FIG. 9D, the bagging film 52 covers the segment front surface 21 of the first segment 20 (i.e., covers the prepreg 50 formed on the outer peripheral surface of the mandrel 11 and the caul plate 51 placed on the prepreg 50), and the seal end portion pressing members 27 are attached onto the bagging film 52. With this, the seal end portion pressing member 27 presses, from above the bagging film 52, the bonding member 54 by which the end portion of the first seal member 26a and the end portion of the second seal member 26b are connected to each other. Therefore, the end portions of the first seal member 26a and the second seal member 26b can be effectively prevented from being exposed from the segment end portion surface 22 even during the autoclaving.

The bonding member 53 for bonding the peripheral portion of the bagging film 52 and the fastening member 28 (see FIG. 6B) for fixing the seal end portion pressing member 27 are not shown in FIG. 9D for convenience of explanation. The bonding member 54 covering the openings of the end portions of the seal grooves 25 is not limited to the configurations shown in FIGS. 9C and 9D. Without connecting the end portion of the first seal member 26a and the end portion of the second seal member 26b as schematically shown in FIG. 6B, only the opening of the end portion of the outer seal groove 25a may be covered with one bonding member 54, and only the opening of the end portion of the inner seal groove 25b may be covered with another bonding member 54.

MODIFIED EXAMPLE

The mold to which the seal structure according to the present disclosure is applied is not limited to the mold 10 (see FIGS. 1A to 4) including the mandrel 11 constituted by the six segments 20 and 30 as described in the present embodiment. The mold according to the present disclosure is only required to be located inside a hollow composite material structure, be constituted by a plurality of segments, and be kept as a single structure by coupling adjacent side surfaces of the segments to each other.

The specific shape of the mold is not limited to the above-described cylindrical shape (a hollow shape with a substantially constant overall diameter) and may be a conical tubular shape (a hollow shape that decreases in diameter from one end to the other) or a truncated cone tubular shape (a hollow shape in which diameters of both ends are different from each other, and an intermediate diameter gradually changes). The seal structure according to the present disclosure is only required to be provided at the adjacent side surfaces of the segments constituting the mold configured as above. Further, the shape of each segment is not limited to the rectangular flat plate shape, and various shapes may be adopted as long as the segments can constitute the mandrel 11 as a single structure.

Further, in the present embodiment, the mandrel 11 is constituted by the three first segments 20 and the three second segments 30 (see FIG. 1B). However, the configuration of the mandrel 11 is not limited to this. For example, the number of segments may be five or less or may be seven or more. The types of the segments are not limited to two types that are the first segment 20 and the second segment 30. A segment different in type from the segments 20 and 30 may be included, or two or more types of segments different in type from the segments 20 and 30 may be used. Or, the mandrel 11 may be constituted by segments of only one type.

In the present embodiment, the seal groove is provided at the first segment 20 including the segment side surfaces 23 facing the horizontal direction or the direction inclined upward relative to the horizontal direction. However, the configuration of the seal groove is not limited to this. The seal groove may be provided on the segment side surface 33 of the second segment 30, or the segment grooves may be provided on both the segment side surface 23 and the segment side surface 33. To be specific, in the present embodiment, some of the segments have the seal grooves on the side surfaces, and the other segments do not have the seal grooves. However, all the segments may have the seal grooves.

In the present embodiment, the seal grooves are provided only at the first segments 20. However, the configuration of the seal grooves is not limited to this. To be specific, the seal groove may be provided on only one of the adjacent side surfaces of the segments, or the seal structures may be provided on both of the adjacent side surfaces of the segments. Examples of a case where the seal grooves are provided at all the segments include a configuration in which the seal groove is provided on only one of both side surfaces of each segment and a configuration in which the seal grooves are provided on both side surfaces of each segment. When the seal groove is provided on only one of both side surfaces of each segment, this corresponds to the configuration in which the seal groove is provided on only one of the adjacent side surfaces of the segments. When the seal grooves are provided on both side surfaces of each segment, this corresponds to the configuration in which the seal grooves are provided on both of the adjacent side surfaces of the segments.

When the seal grooves are provided at both of the adjacent segments, it is preferable that the seal grooves be displaced from each other. One example may be a configuration in which: the outer seal groove and the first seal member are provided on one of the adjacent side surfaces of the segments; and the inner seal groove and the second seal member are provided on the other side surface. Further, in the present embodiment, the number of seal grooves formed on the side surface of the segment is one (see FIG. 6A) or two (see FIG. 6B), and the number of seal members each inserted in the seal groove is one or two. However, the number of seal grooves and the number of seal members are not limited to these. The number of seal grooves may be three or more, and the number of seal members may be three or more. It should be noted that when a plurality of seal grooves are provided on the side surface of the segment, a component (for example, a vacuum suction hole) for performing the vacuum suction between the seal grooves may be additionally provided.

The specific configuration of the seal member inserted in the seal groove is not especially limited. As described above, the seal member is only required to: include the lip portion; and be hollow therein or include the concave portion on the outer peripheral surface thereof. The specific shape of the lip portion is not especially limited. The lip portion may be the upright lip portion 262, the inclined lip portion 265, or a lip portion having a different shape and is only required to have such a shape as to extend at the seal upper portion along the longitudinal direction of the seal main body 261.

The concave portion is only required to be formed on at least the seal bottom portion. However, as described above, the concave portion may be formed on the seal upper portion so as to be located near the lip portion, or although not shown, the concave portion may be formed on the side surface of the seal main body. Basically, the hollow portion formed in the seal main body is only required to have a substantially circular section. However, the hollow portion may have an oval section or a polygonal section. As with the lip portion, each of the hollow portion and the concave portion is only required to have such a shape as to extend along the longitudinal direction of the seal main body 261 in the seal main body or on the outer peripheral surface of the seal main body.

The width of the cross section of the seal member is not especially limited. The seal upper portion and the seal bottom portion may be substantially the same in width as each other (see FIGS. 7A, 7C, and 7D). The seal upper portion may be smaller in width than the seal bottom portion (see FIG. 7B). The seal upper portion may be larger in width than the seal bottom portion (see FIGS. 7E and 7F). A wide portion may be formed between the seal upper portion and the seal bottom portion (the side surface of the seal main body). The width of the seal member may be reduced by the formation of the above-described concave portion. A protruding portion may be formed on the side surface of the seal main body.

As above, a seal structure of a mold for manufacturing a composite material structure according to the present disclosure includes: seal grooves each provided on at least one of adjacent side surfaces of segments; and seal members each formed in a line shape having ends and inserted in the seal groove to seal between the segments by coupling the adjacent side surfaces of the segments to each other. A part of the seal member which part contacts a bottom surface of the seal groove when the seal member is inserted in the seal groove is referred to as a seal bottom portion. A part of the seal member which part is opposed to the seal bottom portion is referred to as a seal upper portion. A lip portion is provided at the seal upper portion such that at least a tip end of the lip portion projects to an outside of the seal groove when the seal member is inserted in the seal groove. The seal member is hollow therein or includes a concave portion on at least the seal bottom portion of the seal member. When the adjacent side surfaces of the segments are coupled to each other, the seal member is crushed in a cross sectional direction by the other of the adjacent side surfaces of the segments.

According to this configuration, the seal member includes the lip portion and the hollow or concave portion and is formed in a line configuration having ends. Therefore, regarding the cross sectional direction of the seal member, the sealed state can be formed by compressing the seal member without applying a high load. Regarding the longitudinal direction of the seal member, the expansion (linear expansion) in the longitudinal direction generated by the heating during the autoclaving can be easily adjusted by both end portions of the seal member. With this, the more satisfactory and stable sealed state can be realized between the adjacent segments. In addition, since the increase in the moving load of the segment can be suppressed or avoided, the level difference between the adjacent segments can be satisfactorily adjusted when assembling the mold. As a result, the complication of the manufacture of the composite material structure can be suppressed or avoided while realizing the satisfactory sealed state between the adjacent segments.

In the seal structure configured as above, the lip portion may project so as to be inclined relative to a normal direction of the seal upper portion.

In the seal structure configured as above, the concave portion may also be formed on the seal upper portion so as to be located close to the lip portion.

In the seal structure configured as above, a width of the seal upper portion in a cross section of the seal member may be larger than a width of the seal bottom portion.

In the seal structure configured as above, the lip portion may project in a normal direction of the seal upper portion, and a width of the seal upper portion in a cross section of the seal member may be smaller than a width of the seal bottom portion.

In the seal structure configured as above, a surface of the segment which surface constitutes an outer peripheral surface of the single structure may be referred to as a front surface of the segment. Both end portions of the seal groove may be bent toward the front surface of the segment. When the seal member is inserted in the seal groove, both end portions of the seal member may be pressed by respective end portion pressing members, provided on the front surface of the segment, so as not to be exposed from the front surface of the segment.

In the seal structure configured as above, the plurality of segments may include: a segment having the side surface on which the seal groove is provided; and a segment having the side surface on which the seal groove is not provided.

In the seal structure configured as above, a surface of the segment which surface constitutes an outer peripheral surface of the single structure may be referred to as a front surface of the segment. The segments may include two types of segments that are first segments each having such a shape that when the first segment is arranged horizontally with the front surface facing upward, each of both side surfaces of the first segment faces a horizontal direction or a direction inclined upward relative to the horizontal direction, and second segments each having such a shape that when the second segment is arranged horizontally with the front surface facing upward, each of both side surfaces of the second segment faces a direction inclined downward relative to the horizontal direction. The first segments and the second segments may be kept as the single structure by alternately arranging the first and second segments and coupling the side surfaces of the first and second segments to each other. The seal grooves may be provided only on the side surfaces of the first segments.

The present invention is not limited to the above embodiment, and various modifications may be made within the scope of the claims. An embodiment obtained by suitably combining technical means disclosed in different embodiments and a plurality of modified examples is also included in the technical scope of the present invention.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The present invention is widely used in the fields of molding a large and substantially cylindrical composite material structure, such as a fuselage of an aircraft.

REFERENCE SIGNS LIST 10 mold for manufacturing composite material structure (mold)
11 mandrel (single structure)
12 support ring
20 first segment (segment)
21 segment front surface
22 segment end portion surface
23 segment side surface
24 segment end surface
25 seal groove
25a outer seal groove (seal groove)
25b inner seal groove (seal groove)
26 seal member
26a first seal member (seal member)
26b second seal member (seal member)
27 seal end portion pressing member (end portion pressing member)
30 second segment (segment)
33 segment side surface
50 prepreg
261 seal main body
262 upright lip portion (lip portion)
263 hollow portion (inner hollow)
264 bottom surface concave portion (concave portion)
265 inclined lip portion (lip portion)
266 upper surface concave portion (concave portion)

The invention claimed is:

1. A seal structure of a mold for manufacturing a hollow composite material structure,
the mold being located in the hollow composite material structure, being constituted by a plurality of segments, and being kept as a single structure by coupling adjacent side surfaces of the segments to each other, the seal structure being provided at the adjacent side surfaces of the segments, the seal structure comprising:
seal grooves each provided on at least one of the adjacent side surfaces of the segments, the seal grooves including a first seal groove that is provided on an adjacent side surface of a first segment; and
seal members each formed in a line shape having ends and inserted in a respective seal groove to seal between the segments by coupling the adjacent side surfaces of the segments to each other, wherein:
the seal members include a first seal member that is inserted in the first seal groove, the first seal member including:
a seal bottom portion that contacts a bottom surface of the first seal groove;
a seal upper portion that is opposed to the seal bottom portion; and
a lip portion provided at the seal upper portion such that at least a tip end of the lip portion projects to an outside of the first seal groove;
the first seal member is hollow therein or includes a concave portion on at least the seal bottom portion of the first seal member;
the adjacent side surface of the first segment and an adjacent side surface of an adjacent second segment are configured to be coupled to each other such that the first seal member is crushed in a cross sectional direction by the adjacent side surface of the second segment;
both end portions of the first seal groove are bent toward a front surface of the first segment, the front surface being an outer peripheral surface of the single structure; and
the first seal member is inserted into the first seal groove such that both ends of the first seal member are pressed by respective end pressing members provided on the front surface of the first segment so as to not be exposed from the front surface of the first segment.

2. The seal structure according to claim 1, wherein the lip portion projects so as to be inclined relative to a normal direction of the seal upper portion.

3. The seal structure according to claim 2, wherein the first seal member includes the concave portion on at least the seal bottom portion, and a second concave portion is formed on the seal upper portion so as to be located close to the lip portion.

4. The seal structure according to claim 2, wherein a width of the seal upper portion in a cross section of the first seal member is larger than a width of the seal bottom portion.

5. The seal structure according to claim 1, wherein:
the lip portion projects in a normal direction of the seal upper portion; and
a width of the seal upper portion in a cross section of the first seal member is smaller than a width of the seal bottom portion.

6. The seal structure according to claim 1, wherein the adjacent side surface of the second segment does not have a seal groove.

7. The seal structure according to claim 6, wherein:
the first segment has a shape such that when the first segment is arranged horizontally with the front surface facing upward, each of both side surfaces of the first segment faces a horizontal direction or a direction inclined upward relative to the horizontal direction,
the second segment has a shape such that when the second segment is arranged horizontally with the front surface facing upward, each of both side surfaces of the second segment faces a direction inclined downward relative to the horizontal direction;
the plurality of segments includes a plurality of first segments and second segments, and the single structure is formed by alternately arranging the first and second segments and coupling side surfaces of the first and second segments to each other; and
the seal grooves are provided only on the side surfaces of the first segments.

* * * * *